(12) United States Patent
Bae

(10) Patent No.: US 7,404,197 B2
(45) Date of Patent: Jul. 22, 2008

(54) DISK DRIVE

(75) Inventor: Byoung-young Bae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 329 days.

(21) Appl. No.: 11/111,961

(22) Filed: Apr. 22, 2005

(65) Prior Publication Data

US 2006/0031857 A1  Feb. 9, 2006

(30) Foreign Application Priority Data

Apr. 24, 2004  (KR) ...................... 10-2004-0028471

(51) Int. Cl.
*G11B 17/04* (2006.01)
(52) U.S. Cl. .................. 720/613; 720/604; 720/648
(58) Field of Classification Search .................. 720/601, 720/604, 605, 613, 641, 648, 655
See application file for complete search history.

(56) References Cited

U.S. PATENT DOCUMENTS

| | | | | |
|---|---|---|---|---|
| 5,058,094 A | * | 10/1991 | Suzuki | 720/706 |
| 5,808,996 A | * | 9/1998 | Aoyama | 720/651 |
| 5,943,309 A | * | 8/1999 | Watanabe | 720/609 |
| 6,031,686 A | | 2/2000 | Konno et al. | |
| 6,529,461 B1 | * | 3/2003 | Watanabe et al. | 720/732 |
| 6,697,321 B2 | * | 2/2004 | Inata et al. | 720/700 |
| 7,020,884 B2 | * | 3/2006 | Choi et al. | 720/613 |
| 7,143,423 B2 | * | 11/2006 | Arase | 720/613 |
| 7,155,731 B2 | * | 12/2006 | Manabe et al. | 720/652 |
| 2003/0043721 A1 | * | 3/2003 | Akatani et al. | 369/77.1 |
| 2006/0095927 A1 | * | 5/2006 | Makino | 720/601 |
| 2006/0248550 A1 | * | 11/2006 | Lee et al. | 720/651 |

FOREIGN PATENT DOCUMENTS

| | | | |
|---|---|---|---|
| JP | 63311681 A | * | 12/1988 |
| JP | 5-325522 | | 12/1993 |
| JP | 7-220462 | | 8/1995 |
| JP | 07254263 A | * | 10/1995 |
| JP | 09237454 A | * | 9/1997 |
| JP | 10106248 A | * | 4/1998 |
| JP | 11162061 A | * | 6/1999 |
| JP | 2006155807 A | * | 6/2006 |
| JP | 2007026508 A | * | 2/2007 |
| KR | 2002-0012975 | | 2/2002 |

OTHER PUBLICATIONS

First Office Action dated Sep. 14, 2007 issued in the corresponding Chinese Application No. 2005100669242 (4 pages); Text of the First Office Action (6 pages in English translation).

* cited by examiner

*Primary Examiner*—William J Klimowicz
(74) *Attorney, Agent, or Firm*—Staas & Halsey LLP

(57) ABSTRACT

A disk drive including a lower case, a tray to be attached and detached to and from the lower case while sliding in the lower case and having a turntable on which a disk is seated, and an upper case installed to cover an upper portion of the lower case. The upper case has at least one deviation-prevention element extending toward the lower case to prevent the disk from deviating from the turntable by an external force on the disk drive by reducing a distance between the upper case and the disk seated on the turntable.

14 Claims, 6 Drawing Sheets

DISK DRIVE

CROSS-REFERENCE TO RELATED APPLICATION

This application claims the priority of Korean Patent Application No. 2004-28471, filed on Apr. 24, 2004, in the Korean Intellectual Property Office, the disclosure of which is incorporated herein in its entirety by reference.

BACKGROUND OF THE INVENTION

1. Field of the Invention

The present invention relates to a disk drive, and more particularly, to a disk drive capable of preventing a disk from deviating from a turntable by an external force and capable of preventing damage to a movable tray holding the disc.

2. Description of the Related Art

In general, a disk drive is a device which reproduces information stored on a disk or records the information to the disk while sliding an optical pickup unit in a radial direction of the disk.

The disk drive used in an information device such as a notebook is necessarily manufactured in a thin form due to its characteristics. Thus, the height or width of the disk drive is limited to a predetermined size.

FIG. 1 is an exploded perspective view of a conventional disk drive, FIG. 2 is a cross-sectional view of the disk drive of FIG. 1, and FIG. 3 is a plan view of a cut stopper.

The disk drive of FIG. 1 includes a lower case 10, an upper case 30 which covers the lower case 10, and a tray 20 which slides in the lower case 10 and on which a disk D is seated (see FIG. 2).

The tray 20 includes a turntable 22 on which the disk D is seated, a spindle motor 24 (see FIG. 2) which is installed on the same axis as that of the turntable 22 and which rotates the turntable 22, and a base frame 21 having an optical pickup unit 23 which slides in a radial direction of the disk D and reproduces information stored on the disk D or records the information on the disk D.

The tray 20 is guided on guide rails 13 installed at both sides of the lower case 10. A guide unit 11 is installed to on both sides of the tray 20 and to slide relative to the guide rails 13, and is attached and detached to and from the lower case 10.

A stopper 12 is formed in a portion of the guide unit 11 and protrudes from an inside of the lower case 10 or the tray 20. A protrusion 14 is formed in a portion of one of the guide rails 13 catches the stopper 12 to restrict a moving distance of the tray 20 when the tray 20 is moved out of the lower case 10. A spacing portion 15 is placed between the lower case 10 and the guide unit 11. The spacing portion 15 is a necessary portion to assist in inserting the guide rails 13 in the lower case 10 during assembly.

However, as shown in FIG. 3, when the tray 20 is moved out of the lower case 10, the protrusion 14 collides with the stopper 12 and the stopper 12 may be cut by a collision shock. Specifically, when an external force is applied to the tray 20 in an X-direction (FIG. 1), the tray 20 is opened in the X-direction, the protrusion 14 collides with the stopper 12 and does not survive the external force, and damage occurs in the guide unit 11 in the direction of the spacing portion 15.

Meanwhile, referring to FIG. 2, a distance G1 is formed between the disk D mounted on the turntable 22 and the upper case 30. The distance G1 is optimized for operation of the disk drive, and is difficult to change.

When an operating shock occurs in a Z-direction (FIG. 1) while the disk drive is in the lower case 10, the disk D clamped in the turntable 22 does not survive the operating shock and may deviate from the turntable 22. In this case, an information recording surface may be damaged, information may be lost, and the disk D may be held in the disk drive such that the tray 20 is not easily opened.

SUMMARY OF THE INVENTION

Accordingly, it is an aspect of the present invention to provide a disk drive capable of preventing a disk from deviating from a turntable by an external force and having a guide unit that endures an external shock when a tray is moved out of a lower case.

Additional aspects and/or advantages of the invention will be set forth in part in the description which follows and, in part, will be obvious from the description, or may be learned by practice of the invention.

The forgoing and/or other aspects are achieved by providing a disk drive including a lower case; a tray to slide in the lower case, including a turntable on which the disk is seated; and an upper case to cover an upper portion of the lower case and having a deviation-prevention element protruding towards the lower case and preventing the disk from being deviated from the turntable by an external force by reducing a distance between the upper case and the disk.

BRIEF DESCRIPTION OF THE DRAWINGS

The above and/or other aspects and advantages of the present invention will become more apparent by describing in detail exemplary embodiments thereof with reference to the attached drawings in which.

DETAILED DESCRIPTION OF THE PREFERRED EMBODIMENTS

Figure 1:
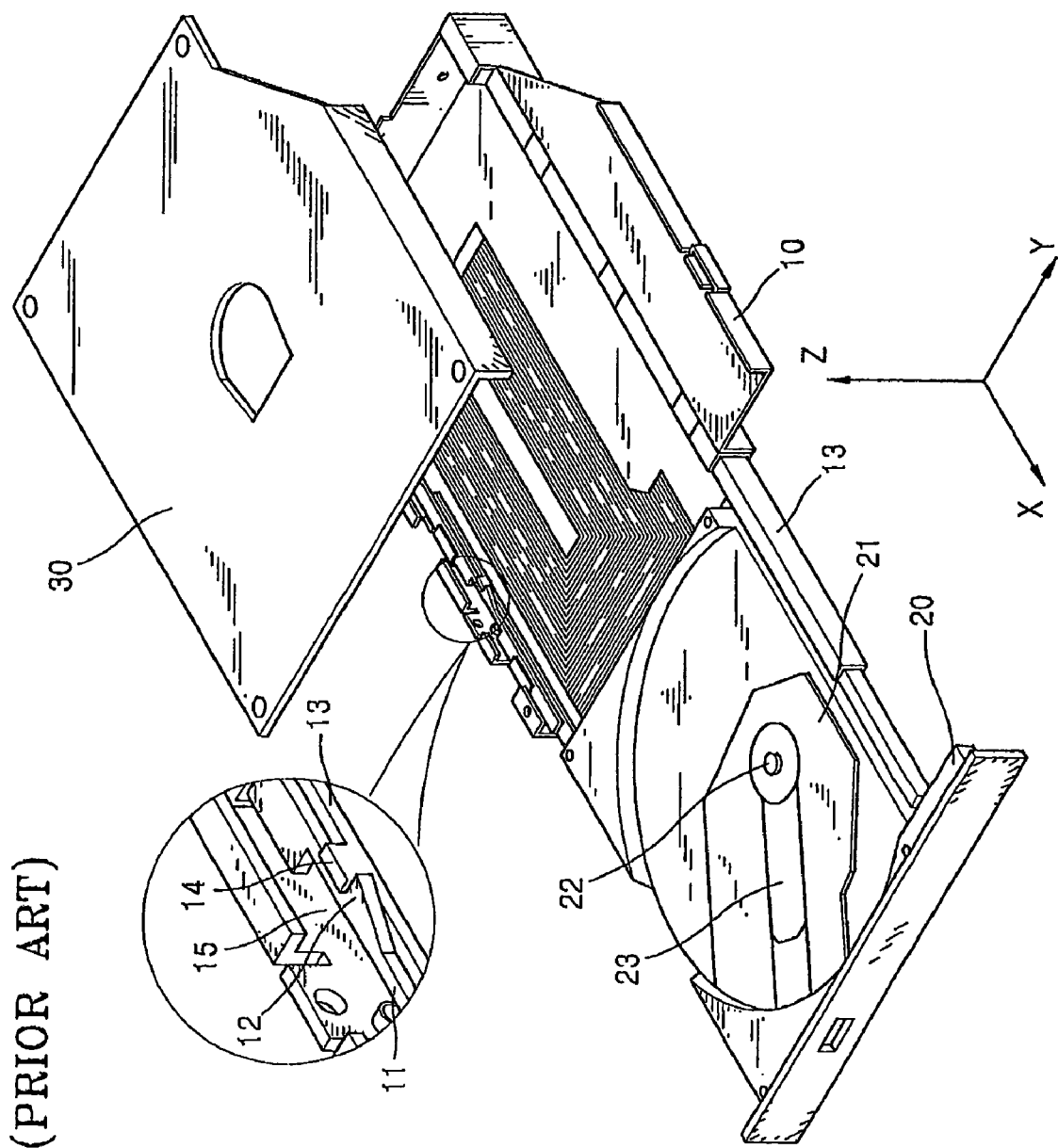
FIG. 1 is an exploded perspective view of a conventional disk drive.

Reference will now be made in detail to the embodiments of the present invention, examples of which are illustrated in the accompanying drawings, wherein like reference numerals refer to like elements throughout. The embodiments are described below to explain the present invention by referring to the figures.

Figure 4:
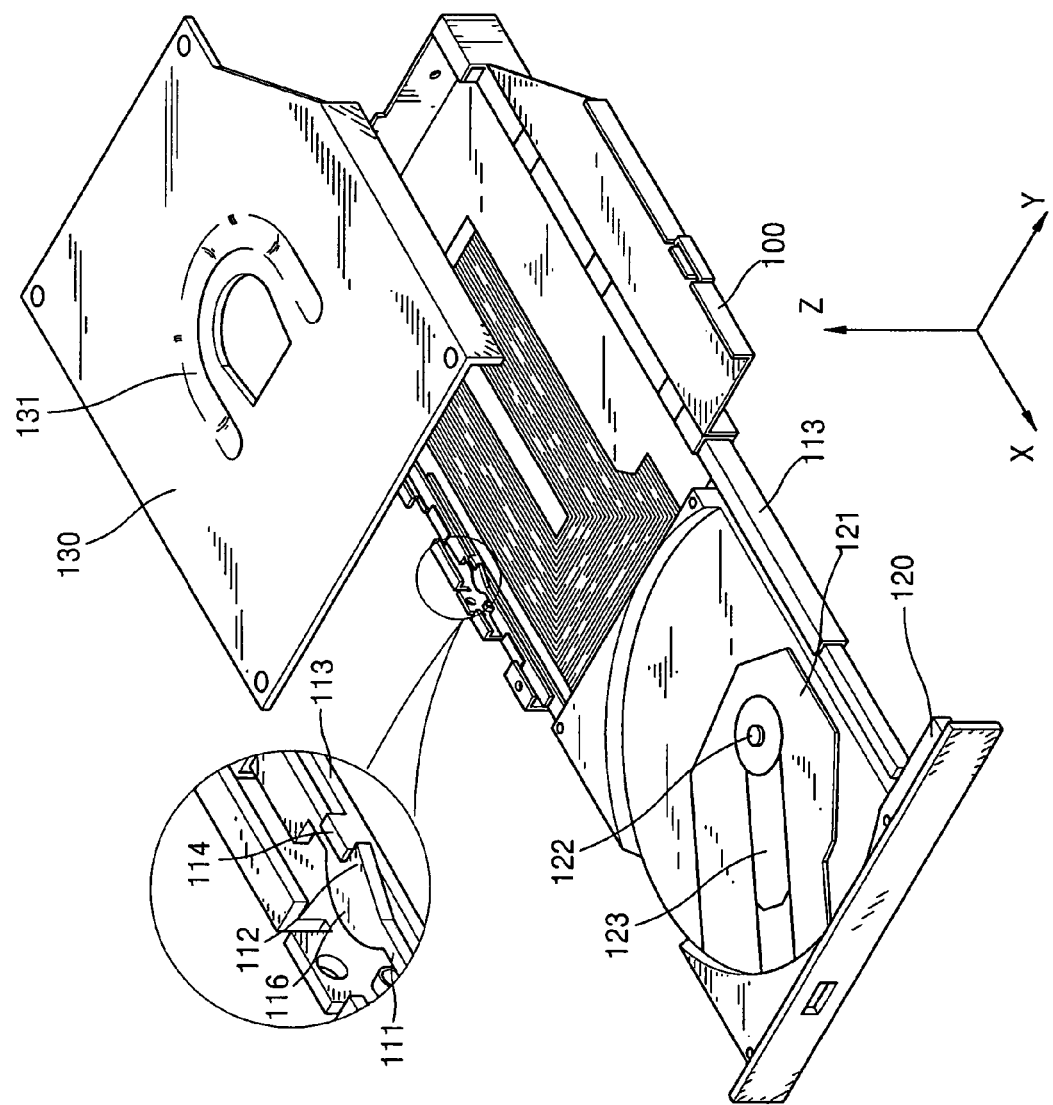
FIG. 4 is an exploded perspective view of a disk drive according to an embodiment of the present invention.

Referring to FIG. 4, a disk drive includes a lower case 100, an upper case 130 which covers the lower case 100, and a tray 120 which is installed to slides in the lower case 100 and on which a disk D is seated.

The tray 120 includes a turntable 122 on which the disk D is seated, a spindle motor 124 (see FIG. 6) which is installed on the same axis as the turntable 122 and which rotates the turntable 122, and a base frame 121 having an optical pickup unit 123 which is installed to slides in a radial direction of the disk D and reproduces information stored on the disk D or records the information to the disk D.

Guide rails 113 are installed at both sides of the tray 120, and a protrusion 114 is formed in a portion of one of the guide rails 113 and protrudes upwards, that is, toward the upper case 130.

Figure 5:
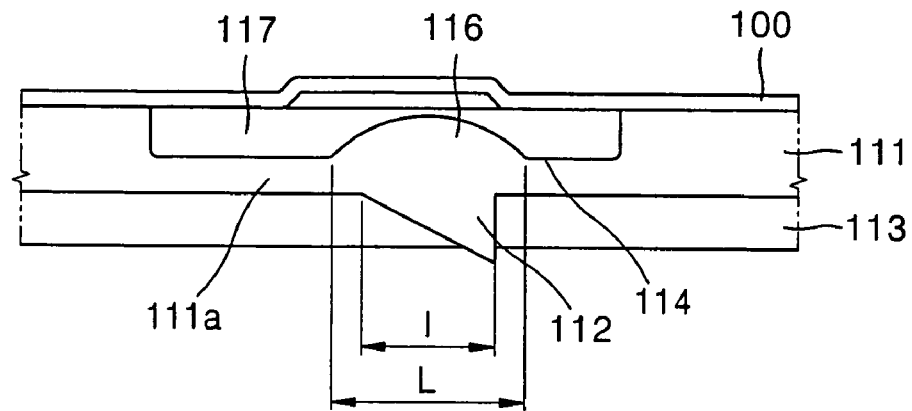
FIG. 5 is a partial enlarged view of a portion of a lower case of FIG. 4.

Referring to FIG. 5, a guide unit 111 is installed at both sides of the lower case 100. The guide rails 113 are inserted into the guide unit 111, and the guide unit 111 guides the guide rails 113 to slide. A stopper 112 is formed in the guide unit 111 corresponding to the guide rails 113 in which the protrusion 114 is formed. The stopper 112 protrudes from a direction in which the guide rails 113 face each other. A spacing portion 117 is placed between the lower case 100 and the guide unit 111.

A portion 111a of the guide unit 111 having the stopper 112 is thinner than other portions of the guide unit 111 so as to form the spacing portion 117 separated from the lower case 100 by a predetermined distance. Thus, the portion 111a itself has an elastic force and can be elastically deformed. The portion 111a is elastically deformed when the guide rails 113 are assembled in the guide unit 111 such that the stopper 112 is prevented from being caught on the protrusion 114 and the spacing portion 117 is formed in the portion 111a for ease of assembly.

A reinforcement unit 116 is formed on an opposite side of the portion 111a having the stopper 112 to protrude from the spacing portion 117. The length L (the length in which the tray 120 is attached and detached to and from the lower case 100) of the reinforcement unit 116 may be larger than the length I of the stopper 112. In addition, the reinforcement unit 116 may be formed so that the length L of the reinforcement unit 116 is greater than the length I of the stopper 112 and the lengths L and I overlap each other.

Thus, the stopper 112 alleviates the concentration of stress where it is connected to the guide rails 113 so that the stopper 112 is prevented from being damaged by a shock against the protrusion 114. The reinforcement unit 116 may have a variety of shapes that maintain its function.

In the above structure, the tray 120 is attached and detached to and from the lower case 100 as the guide rail 113 slides along the guide unit 111. When the tray 120 is removed from the lower case 100, the protrusion 114 collides with the stopper 112 and is stopped.

Figure 6:
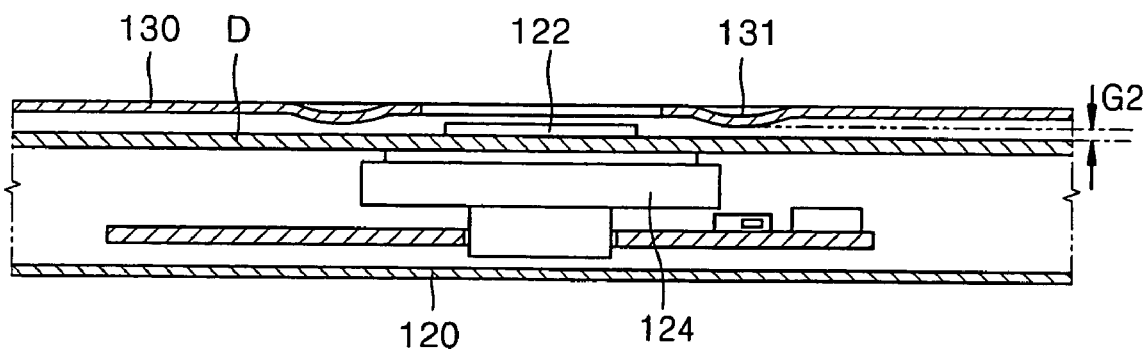
FIG. 6 is a cross-sectional view of the disk drive of FIG. 4.

Referring to FIGS. 4 and 6, a deviation-prevention element 131 is formed in the upper case 130 and protrudes from a direction opposite to the lower case 100, that is, to face the disk D seated on the turntable 122.

The deviation-prevention element 131 faces a noninformation area of the disk D, that is, an inside (a circumference of a portion seated on the turntable 122) of the disk D. This prevents information stored on the disk D from being damaged by a collision caused by an external shock applied to the deviation-prevention element 131.

The deviation-prevention element 131 is not formed in an area in which the tray 120 is attached and detached to and from the lower case 100 and also faces the noninformation area of the disk D, so as not to interfere with an operation of attaching and detaching the tray 120 to and from the lower case 100. The deviation-prevention element 131 has a U-shape, but is not limited to this shape and may have a variety of shapes in which the deviation-prevention element 131 faces the noninformation area of the disk D, excluding the direction in which the tray 120 is attached and detached to and from the lower case 100.

The deviation-prevention element 131 may be formed as one piece with the upper case 130.

Figure 2:
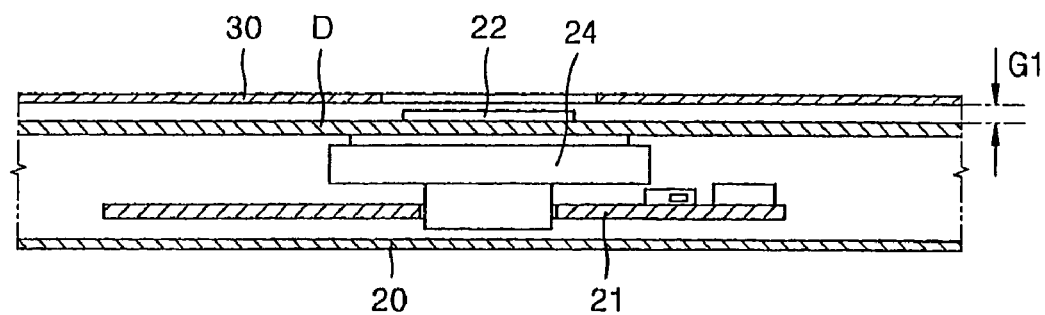
FIG. 2 is a cross-sectional view of the disk drive of FIG. 1.
Figure 3:
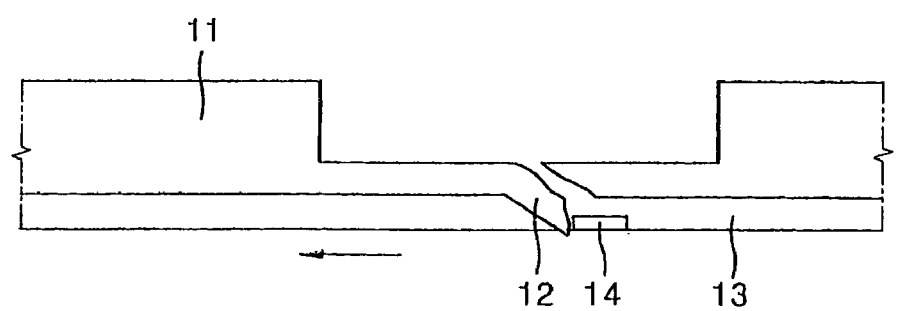
FIG. 3 is a plan view of a cut stopper of FIG. 1.

A distance G2 between the deviation-prevention element 131 and the disk D is smaller than a distance G1 (see FIG. 2) between the upper case 130 and the disk D so that the deviation-prevention element 131 prevents the disk D from being detached from the turntable 122 by an external shock.

Figure 7:
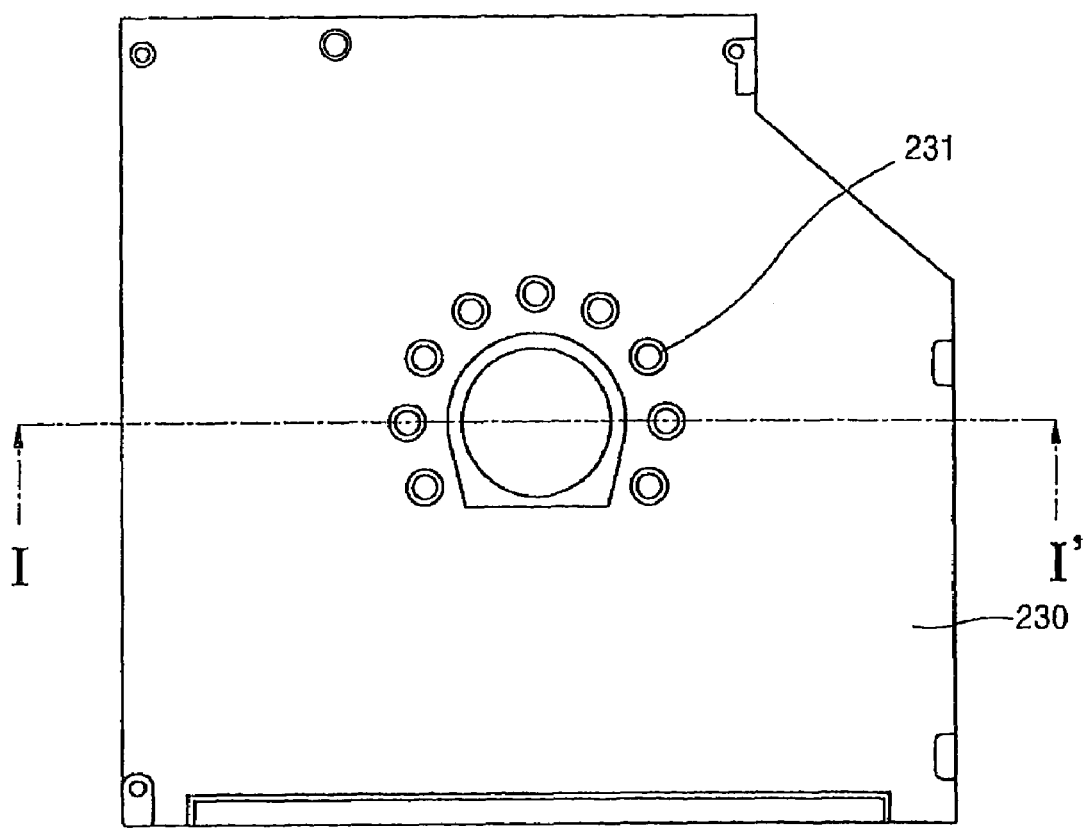
FIG. 7 is a plan view of a deviation-prevention element according to an embodiment of the present invention.
Figure 8:
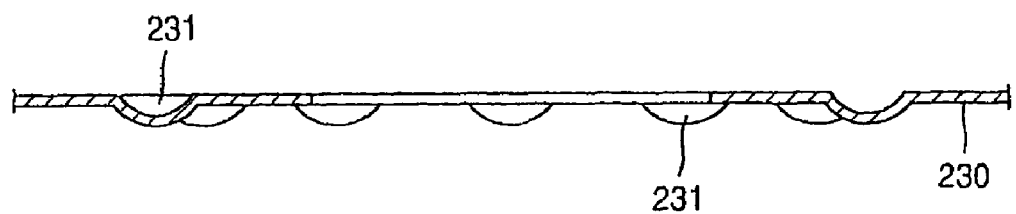
FIG. 8 is a cross-sectional view taken along line I-I' of FIG. 7.

Referring to FIGS. 7 and 8, a plurality of deviation-prevention elements 231 protrudes from an upper case 230 (similar to the upper case 130) to face the disk D seated on the turntable 122. In addition, the deviation-prevention elements 131 face a noninformation area of the disk D, that is, an inside of the disk D. The deviation-prevention elements 231 can again be formed as one body with the upper case 230.

The operation of the deviation-prevention element 231 is similar to that of the deviation-prevention element 131 of FIGS. 4 and 6 and thus, detailed descriptions thereof will be omitted.

Figure 9:
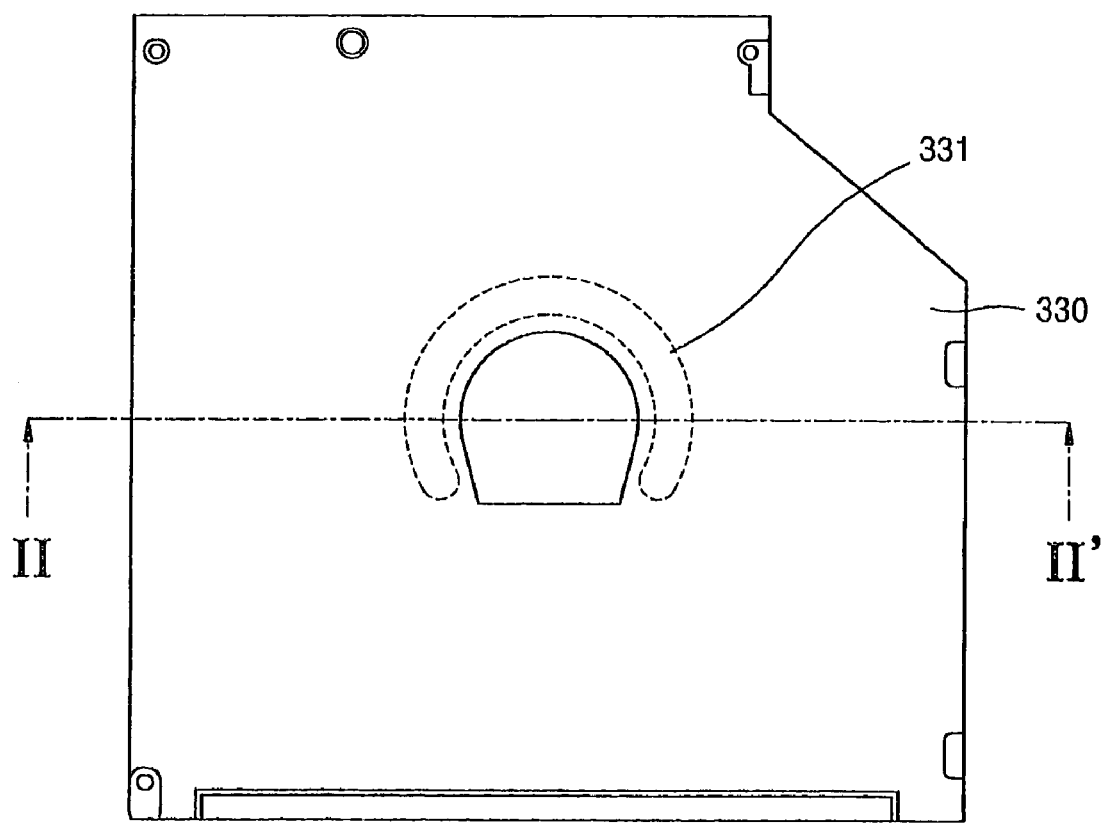
FIG. 9 is a plan view of a deviation-prevention element according to another embodiment of the present invention.
Figure 10:
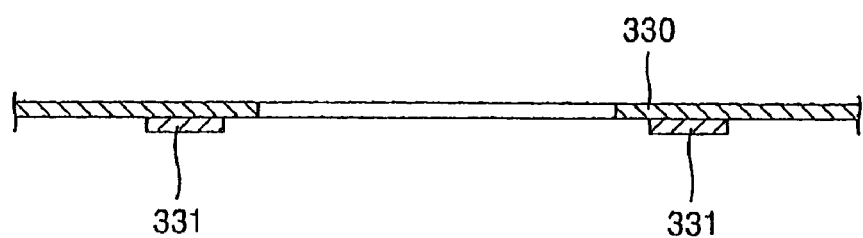
FIG. 10 is a cross-sectional view taken along a line II-II' of FIG. 9.

Referring to FIGS. 9 and 10, a deviation-prevention element 331 is formed by attaching an adhesion sheet having a predetermined thickness to a bottom surface of an upper case 330 (similar to the upper case 130). In this case, even though the deviation-prevention element 331 is not formed as one body with the upper case 330, the deviation-prevention element 331 may easily be installed in a disk drive for ease of manufacture. The operation of the deviation-prevention element 331 is similar to that of the deviation-prevention element 131 of FIGS. 4 and 6 and thus, detailed descriptions thereof will be omitted.

As described above, in the disk drive according to the embodiments of the present invention, a disk is prevented from being deviated from a turntable by an external force, and even though an external shock is applied to a direction in which a tray is opened, a guide unit survives the external shock and is not damaged.

While the present invention has been particularly shown and described with reference to exemplary embodiments thereof, it will be understood by those skilled in the art that various changes in form and details may be made therein without departing from the spirit and scope of the invention, as defined by the following claims.

What is claimed is:

1. A disk drive to operate a disk, comprising:
   a lower case;
   a tray attached to slide in the lower case;
   a turntable on which the disk is seated;
   an upper case to cover an upper portion of the lower case and having at least one deviation-prevention element protruding towards the lower case and preventing the disk from being deviated from the turntable by an external force applied to the disk drive by reducing a distance between the upper case and the disk,
   wherein the at least one deviation-prevention element faces a noninformation area of the disk,
   a guide rail on a side of the tray, comprising a protrusion;
   a guide unit comprising a stopper, the stopper protruding from the guide unit to contact the protrusion; and
   a reinforcement unit, protruding from the guide unit opposite the stopper.

2. The disk drive of claim 1, wherein the deviation-prevention element is not formed opposite to an area in which the tray is attached to and from the lower case.

3. The disk drive of claim 2, the at least one deviation-prevention element is a plurality of deviation-prevention elements spaced from each other.

4. The disk drive of claim 2, wherein the at least one deviation-prevention element is formed of an adhesion sheet.

5. The disk drive of claim 2, wherein the at least one deviation-prevention element is formed as one piece with the upper case.

6. The disk drive of claim 1, wherein a distance between the at least one deviation-prevention element and the disk is less than a distance between the upper case and the disk.

7. The disk drive of claim 1, wherein the at least one deviation-prevention element has a U-shape.

8. The disk drive of claim 1, wherein the reinforcement unit has a length longer than a length of the stopper along an axis in which the tray is attached and detached to and from the lower case.

9. A disk drive comprising:
   a lower case;
   a tray attached and detached to and from the lower case;
   a guide unit installed at opposite sides of the lower case to slidably guide the tray in the lower case;
   a stopper protruding from the guide unit; and
   a reinforcement unit, protruding from the guide unit opposite the stopper, and having a length longer than a length of the stopper along an axis in which the tray is attached and detached to and from the lower case.

10. The disk drive of claim 9, wherein the guide unit further comprises a protrusion to collide with the stopper when the tray slides in the lower case.

11. The disk drive of claim 9, wherein the guide unit further comprises a spacing portion having a thickness less than a thickness of a portion of the guide unit from which the stopper protrudes, to thereby space the spacing portion from the lower case.

12. The disk drive of claim 11, wherein the guide unit further comprises a plurality of guide rail on each side of the tray.

13. The disk drive of claim 12, wherein the spacing portion is elastically deformed when the guide rails are assembled in the guide unit.

14. A case to contain a disk operated on by a disk drive having a turntable to secure the disk, the case comprising:
   a cover portion to cover the disk;
   a protrusion protruding towards the disk from the cover, the disk remaining secured to the turntable even when an external force is received by the case,
   wherein the protrusion faces a noninformation area of the disk,
   a guide rail on a side of the turntable, comprising a protrusion;
   a guide unit comprising a stopper, the stopper protruding from the guide unit to contact the protrusion; and
   a reinforcement unit, protruding from the guide unit opposite the stopper.

* * * * *